US006462138B1

(12) United States Patent
Rupaner et al.

(10) Patent No.: US 6,462,138 B1
(45) Date of Patent: Oct. 8, 2002

(54) METHOD FOR REDUCING RESIDUAL MONOMERS IN LIQUID SYSTEMS BY ADDING AN OXIDATION-REDUCTION INITIATOR SYSTEM

(75) Inventors: Robert Rupaner, Ellerstadt; Sven Lawrenz, Mannheim; Johannes Dobbelaar, Wachenheim; Gerhard Bauer, Weinheim; Franz-Josef Mueseler; Werner Kirchner, both of Neustadt; Bradley Ronald Morrison, Mannheim; Jürgen Nahstoll, Eisenberg; Martin Meister, Neustadt; Reinhard Bächer, Bad Dürkheim; Wolfgang Hübinger, Limburgerhof; Gerhard Schumacher, Heidelberg, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/508,089

(22) PCT Filed: Sep. 17, 1998

(86) PCT No.: PCT/EP98/05927

§ 371 (c)(1),
(2), (4) Date: Mar. 15, 2000

(87) PCT Pub. No.: WO99/14248

PCT Pub. Date: Mar. 25, 1999

(30) Foreign Application Priority Data

Sep. 18, 1997 (DE) .......................... 197 41 184

(51) Int. Cl.[7] .................................................. C08F 6/00
(52) U.S. Cl. ................................ 525/329.1; 525/329.2; 525/330.3; 525/330.4; 525/330.6; 525/344; 525/345; 525/370; 525/371; 525/387; 526/919
(58) Field of Search ...................... 525/329.1, 329.2, 525/330.3, 330.6, 330.4, 344, 345, 370, 371, 382; 526/919

(56) References Cited

U.S. PATENT DOCUMENTS

| 4,277,684 A | 7/1981 | Arkens |
| 4,289,823 A | 9/1981 | Arkens |
| 4,351,875 A | 9/1982 | Arkens |
| 4,529,753 A | 7/1985 | Taylor |
| 4,758,641 A | 7/1988 | Hsu |
| 4,900,615 A | 2/1990 | Kissell et al. |
| 4,908,229 A | 3/1990 | Kissell |
| 4,966,791 A | 10/1990 | Kissell et al. |
| 5,055,510 A | 10/1991 | Kissell |
| 5,059,456 A | 10/1991 | Larson et al. |
| 5,230,950 A | 7/1993 | Kissell |
| 5,264,475 A | 11/1993 | Kissell |
| 5,270,121 A | 12/1993 | Kissell |
| 5,283,277 A | 2/1994 | Kissell |
| 5,385,756 A | 1/1995 | Lofton |
| 5,403,894 A | 4/1995 | Tsai et al. |
| 5,430,127 A | 7/1995 | Kelly |
| 5,451,432 A | 9/1995 | Lofton |
| 5,484,849 A | 1/1996 | Bors et al. |
| 5,559,192 A | 9/1996 | Bors et al. |
| 5,576,384 A | 11/1996 | Noelken et al. |
| 5,708,077 A | 1/1998 | Noelken et al. |

FOREIGN PATENT DOCUMENTS

| DE | 44 19 518 | 12/1995 |
| DE | 195 29 599 | 2/1997 |
| EP | 0 767 180 | 4/1997 |
| EP | 0 865 821 | 9/1998 |

OTHER PUBLICATIONS

Derwent Abstract 91–082185/12 of EP 417906A, Mar. 1991.
Derwent Abstract 94–343300143 of EP 623659A2, Nov. 1994.

*Primary Examiner*—D. R. Wilson
(74) *Attorney, Agent, or Firm*—Oblon, Spivak, McClelland, Maier & Neustadt, P.C.

(57) ABSTRACT

A process is described for reducing the residual monomer content in a liquid solution, mixture, melt, suspension or dispersion of a polymer by postpolymerization with addition of a redox initiator system at a reaction temperature appropriate to it and with an extremely short mixing time of the liquid system in the production reactor by metering— gradually, in portions or continuously—at least one of the redox initiator components required to initiate polymerization of the residual monomers over a period (metering time) which is from about 10 to 250 times the mixing time of the liquid system in said reactor.

12 Claims, No Drawings

METHOD FOR REDUCING RESIDUAL MONOMERS IN LIQUID SYSTEMS BY ADDING AN OXIDATION-REDUCTION INITIATOR SYSTEM

Lessening residual monomers in liquid systems by adding a redox initiator system The invention relates to a process for reducing the residual monomer content in a liquid polymer system by postpolymerizing with addition of a redox initiator system.

In the customary free-radically initiated polymerization of olefinically unsaturated monomers or monomer mixtures, the polymerization reaction normally proceeds only to a monomer conversion of from 90 to 99% by weight, irrespective of whether it is conducted in solution, in bulk, in suspension or in dispersion. The skilled worker is aware of the reasons for the incomplete reaction of the monomers (Trommsdorf-Norrish effect, reduction in diffusion rate, transfer and branching reactions, etc.). The resulting unreacted monomers which remain in the system (residual monomers) are undesirable for various reasons (reduction in degree of conversion, polymer contamination, odor, toxicity and/or flammability of the monomers, etc.). There has therefore been no lack of attempts to remove or reduce the amount of residual monomers remaining after the main polymerization. This step is referred to hereinbelow as postpolymerization.

Thus it is known, inter alia, to remove residual monomers by treatment with steam in a kind of steam distillation (cf. eg. EP-A 327 006, EP-A 650 977 or U.S. Pat. No. 4,529,753). The treatment, however, is complex and applies only to aqueous systems, and its success is dependent on the volatility of the target monomers. It is also customary following the main polymerization to add polymerization initiators again to the batch and to conduct an aftertreatment, known as postpolymerization, at an appropriate polymerization temperature so as to reduce the amount of residual monomers. In this context the addition of redox initiator systems has been widely described (cf. eg. U.S. Pat. No. 4,289,823, EP-A 9258, EP-A 241 127, EP-A 357 287, EP-A 417 960, EP-A 455 379, EP-A 474 415, EP-A 492 847, EP-A 522 791, EP-A 623 659). Frequently a twofold aftertreatment, in EP-A 9258 even a threefold aftertreatment, is recommended in order to polymerize fully the residual monomers. A repeat aftertreatment, however, is undesirable since it prevents the polymerization reactor being used again quickly for its principal purpose. The multiplicity of solutions recommended in the prior art is an indication that no satisfactory solution has been found. As indicated for example in EP-A 279 892, the success of the appropriate aftertreatment depends also on the size of the reactor used. For example, the temperature control and the homogenization behavior of large production reactors is very different from that of laboratory reactors, and simply transferring the residual monomer reduction experiences gained to large production reactors is in general not possible.

It is an object of the present invention to provide a process which can be carried out on a large scale and achieves a successful reduction in residual monomers by postpolymerization in a liquid system in a production reactor, by which is meant a reactor having a volume of more than 20 and preferably more than 100 liters.

We have found that this object is achieved and that the residual monomer content of a liquid solution, mixture, melt, suspension or dispersion of a polymer prepared by free-radical polymerization is reduced by postpolymerization with addition of a redox initiator system at a reaction temperature appropriate to it, which comprises metering—gradually, in portions or continuously—at least one of the redox initiator components required to initiate polymerization of the residual monomers into the reaction mixture in a production reactor, with a defined and extremely short mixing time of the liquid system in the production reactor, over a period (metering time) which is from about 10 to 250, in particular from 20 to 100, times the mixing time of the liquid system in said reactor.

An important technical parameter which plays a part in the process for controlled reduction of residual monomers in the liquid polymer system is the mixing time $\theta$ of the liquid system in the production reactor used, by which is meant the time required to obtain a certain degree of homogenization by mixing and, in particular, by stirring. To determine the mixing time it is common to use the schlieren method and the chemical decolorization method. The latter involves adding a reagent to the liquid and coloring the liquid with an indicator. Then, at the beginning of mixing or stirring, the second reagent is added and a measurement is made of the time which elapses until the coloration disappears. The endpoint degree of homogenization depends on the excess of the added reaction component.

The mixing time is dependent, inter alia, on the Reynolds number, which depends in turn on the reactor form, on the type and speed of the stirrer and on the density and viscosity of the liquid system. Scaling up the mixing time from small to large reactors is difficult and always accompanied by errors, since there are no reliable literature data for calculating nonnewtonian liquids such as dispersions. For simple model calculations the literature (see eg. Ullmanns Encyklopädie der techn. Chemie, 4th Edition, Volume 2, pages 259 ff., especially 263–264 and FIG. 9) offers idealized relationships for liquids with no differences in density or viscosity, which allow an approximate calculation of a minimum mixing time. From the viscosity $\eta$ of the liquid medium, its density $\rho$, the stirrer speed n and the stirrer diameter d and taking into account the boundary conditions it is possible to calculate the Reynolds number Re of the system and, from this number, the mixing time $\theta$:

$Re = n\ d^2 \rho/\eta$ (1)  n  $\theta = f(Re)$

In accordance with these equations, the mixing time for idealized stirred reactors (laboratory, pilot and production scale) was calculated for the case of an anchor stirrer and an aqueous polymer dispersion with a viscosity of 30 mPas and a density of 1 g/cm$^3$, taking into account the geometric similarities; the results of these calculations are shown in the table below. The chosen stirrer speeds n are based on practical experience. As the diameter of the stirrer blade increases there is a rise in the stirring speed and hence in the shear to which the stirred material is exposed. In order to obtain a comparable and constant input of power into the variously dimensioned reactors and to avoid an excessive rise in the peripheral stirrer speed, it is common practice to reduce the stirrer speed as the size of the reactor goes up. The table below shows that the mixing time changes with the reactor size.

| Reactor | Speed n/s | Stirrer diameter (mm) | Peripheral speed | Reynolds number | Mixing time θ (s) |
|---|---|---|---|---|---|
| Laboratory | 2.5 | 110 | 860 | 1000 | 40 |
| Pilot plant | 1 | 1100 | 3400 | 40,000 | 60 |
| Production | 0.666 | 2500 | 5200 | 140,000 | 120 |

Simply transferring the aftertreatment conditions from the laboratory scale, as is described in the prior art, to larger stirred vessels is hence not an option.

When the height to diameter ratio (H/D) of the reactors changes toward greater elongation, as is preferred on the basis of favorable heat dissipation, there is a sharp rise in the mixing time. For a cross-arm stirrer Ullmann (loc. cit.) gives: $n\theta=16.5\times(H/D)^{2.6}$. For a production reactor with a typical H/D of from 2 to 2.5, the mixing time rises by a factor of from 5 to 10, despite the fact that the cross-arm stirrer is a better mixer than the anchor stirrer.

In accordance with the process of the invention the liquid-system mixing time in the reactor should be extremely short. This requires not only slow metering of at least one of the components of the initiator system used but also its effective stirred incorporation into the liquid system. To achieve this it is possible firstly to choose a production reactor having suitable geometric parameters, a highly effective stirrer with appropriate speeds, or combinations thereof. Hence a reduction in mixing time can be achieved by using a close-clearance helical stirrer or coaxial stirrer. Also suitable for this purpose is the use of a close-clearance multistage stirrer with a strong axial mixing action. By a close-clearance stirrer is meant one in which the ratio of stirrer diameter to reactor diameter, reduced by twice the width of any flow disruptor present, is at least 0.9. Every stirrer possesses a radial flow direction, in other words a flow direction directed against the reactor wall, whereas with many stirrers the axial flow direction is less pronounced. Axial mixing is intensified in particular by the use of a multistage stirrer, in which a plurality of stirrers are mounted along the axial, vertical stirrer shaft. In view in particular of the customary introduction of the reaction components from above through the reactor lid or from below through the reactor floor, extremely high axial mixing is required in order to achieve rapid incorporation by stirring and to lessen the consumption of the reaction component by reaction actually during the mixing time. The mixing time can also be lowered by using a close-clearance MIG or INTERMIG stirrer, impeller, propeller or disk stirrer, or a close-clearance anchor stirrer or close-clearance gate-type stirrer. It is often advantageous in this instance to increase the action of the stirrer further by production reactor internals such as flow disruptors, guide vanes or other flow diverters.

Other than the selection of stirrer type and of further reactor internals, important factors which can be optimized and which affect the mixing time are stirrer speed, viscosity, density, type and concentration of reagent, and the metering time. The viscosity of the fluid medium exerts an extremely great influence over the mixing time properties of the reactor. It is for this reason that particularly low mixing times are realized in the case of heterophase polymers, i.e. polymer dispersions and polymer suspensions, since these systems have markedly lower viscosities than solutions or melts.

Where an added agent, such as a metered component of an initiator system, is to be reacted with a residual monomer in an imagined volume subelement of the reaction mixture, the agent must arrive there without being consumed beforehand. If any prior side reactions occur, this prolongs the mixing time, which with rapid side reactions can be infinite. For thorough mixing it is necessary to conduct metering over a period (metering time) which is always longer than the defined mixing time of the liquid system in the production reactor used. In accordance with the process of the invention, the metering time should be from 10 to 250, especially from 20 to 100 and, with particular preference, from 25 to 50 times the mixing time of the liquid system in the production reactor used. With mixing times of from 1 to 30 minutes, these correspond approximately to metering times of from 10 minutes to 20 hours, in particular from 20 minutes to 10 hours and, preferably, from 30 minutes to 5 hours.

The metering time also depends, however, on the reaction rate of the free-radical-releasing system used, on its side reactions and, generally, on its halflife at the reaction temperature that is employed for the aftertreatment. At a high reaction temperature some of the initiator added, depending on its decomposition halflife and on the system parameters, such as pH, may decompose actually during the mixing period. The metering time should therefore correspond at least to the sum of initiator system halflife at the prevailing reaction temperature plus from 10 to 20 times the mixing time. In the case of two-component redox initiators it must also be borne in mind that, especially when the components are added simultaneously with a relatively high concentration of component A at the point where component B is fed in, component B may be consumed by reaction without exerting any monomer-reducing effect. Consequently, spatially separate addition of the oxidizing component and the reducing component is significant for effective reduction of monomers during their consumption insofar as the buildup of large concentration gradients has not already been avoided by appropriate temporal metering of the individual components. Particularly disadvantageous is a buildup of concentration gradients in terms of component A and component B of the initiator system at the same end of the reactor (top or bottom), which can lead to a rapid consumption of the components by reaction with one another but one which is highly ineffectual in terms of lessening the residual monomer.

The metered addition of at least one initiator component in accordance with the process of the invention can be made such that a solution of the component to be added is sprayed directly in a thin jet onto the surface of the liquid system in the reactor. More preferable, however, is to add said component to the reaction mixture later from below through an aperture in the reactor floor or through an aperture in the reactor sidewall, especially when using a close-clearance stirrer. In this way the added solution enters zones of very high turbulence. Metering through the internal aperture of a hollow stirrer is particularly advantageous, with the metered solution being guided permanently into the high-turbulence zones. In contrast, if the solution is supplied through an aperture in the reactor sidewall and an anchor stirrer is used, it enters a turbulent zone only if the stirrer is at that moment passing the entry aperture in the sidewall. Preference is also given to metered addition by way of a foam breaker which rotates above the liquid system. The rotary movement of this foam breaker destroys mechanically the foam which is formed by the intense stirring and mixing, an effect to which the solution irrigating the liquid surface also contributes.

The temperature of the reaction mixture in the production reactor during the metered addition of the component added last is guided in part by the redox initiator system used and its halflife at the reaction temperature.

The reaction temperature is in general from 20 to 140° C., in particular from 30 to 120° C. and, in the case of dispersions and suspensions, preferably from 30 to 95° C.

The process can be carried out practically with all customary redox initiator systems which in particular are highly effective at relatively low reaction temperatures and have a sufficient solubility in aqueous systems in the case of the aftertreatment of aqueous polymer dispersions or suspensions. The metal ions that are frequently used in addition to the oxidation and reduction components are added to one of said components or are already in homogeneous distribution within the reaction medium, as a component, for example, from the main polymerization. Examples of metals which catalyze the redox reaction are salts and complexes of iron, copper, manganese, silver, platinum, vanadium, nickel, chromium, palladium or cobalt, it being possible for the metals in each case to be in various oxidation states. Examples of suitable oxidation components of the redox systems are water-soluble hydroperoxides, tert-butyl hydroperoxide, cumene hydroperoxide, hydrogen peroxide or an ammonium or alkali metal salt of peroxodisulfuric acid.

Examples of suitable reducing agents are ascorbic acid, isoascorbic acid, organic compounds having thiol or disulfide groups, reductive inorganic alkali metal and ammonium salts of sulfur-containing acids, such as sodium sulfite, disulfite, thiosulfate, hydrosulfite, sulfide, hydrosulfide or dithionite, formamidinesulfinic acid, hydroxymethanesulfinic acid, acetone bisulfite, amines such as ethanolamine, or enediols. Oxidizing agents that are gaseous under standard conditions, such as oxygen, ozone or air, or gaseous reducing agents, such as sulfur dioxide, can also be used as reaction components of the redox system. The components of the redox system can be metered simultaneously or successively to the reaction mixture (for example, both from above, or one from above and one from below), with spatially separate addition (reactor lid, reactor floor, reactor sidewall) being highly advantageous. It is also possible that the reaction mixture may already, from the phase of the main polymerization - which is generally conducted to a monomer conversion of 90, especially 95 and preferably 99% by weight - comprise sufficient oxidizing agent, reducing agent or metal catalyst that only any component in which it is deficient need be metered in a sufficient amount at the aftertreatment stage. Regarding the amounts of the redox initiator components used it is noted that, customarily, amounts of from 0.01 to 0.5%, in particulr from 0.05 to 0.4% and, preferably, from 0.2 to 0.3% by weight are used, based on the overall mass of the monomers employed for the main polymerization.

Instead of redox systems the free-radical source used may also comprise initiators, such as dialkyl or diacyl peroxides, azo compounds, perketals or peracetals, or free radicals produced by means of high-energy irradiation or by means of ultrasound.

The process of the invention is particularly suitable for reducing the residual monomers in liquid systems of acrylate, methacrylate (esters of acrylic or methacrylic acid with $C_1$-$C_{12}$-alkanols, especially $C_1$-$C_8$-alkanols, particular preference being given to methyl, ethyl, n-butyl and 2-ethylhexyl acrylate and methacrylate), styrene, vinyl chloride or vinyl acetate copolymers, such as styrene-butadiene copolymers or ethylene-vinyl acetate copolymers. In addition to these principal monomers the monomer mixtures used for polymerization may also include minor amounts, in particular from 0.01 to 10% by weight of the overall monomer amount, of polar monomers such as acrylic and methacrylic acid, methacrylamide and acrylamide and/or their N-methylol derivatives, maleic acid or its anhydride, acrylonitrile, methacrylonitrile, or hydroxyalkyl (meth) acrylates, for example. The process is particularly suitable for reducing residual monomers in aqueous dispersions.

The preparation of the polymers used in accordance with the invention for an aftertreatment is known to the skilled worker from the technical literature.

The examples which follow are intended to illustrate the invention without restricting it. Unless specified otherwise, parts and percentages are by weight. The residual monomer amounts specified in the examples were determined by gas chromatography (GC). The solids contents (SC) were determined by gravimetry after drying. The LT is the light transmittance of a 0.01% strength by weight sample of the corresponding polymer dispersion over a path length of 25 mm in comparison with pure water. The particle weight distribution (PWD) was determined by hydrodynamic capillary fractionation or using an ultracentrifuge.

The dispersion viscosities, in mPas, were measured in a customary commercial rotary viscometer (Rheomat) at a shear rate of 500/s.

EXAMPLE 1

1a. A 1.3 $m^3$ production reactor with an anchor stirrer (ratio of stirrer blade to reactor diameter d/D: 0.7; stirrer speed: 50 revolutions per minute), whose metal parts were electro-polished, was charged with 317 kg of water and 4.4 kg of emulsifier (EM), and 2% of the monomer emulsion ME1 below was added to this initial charge.

---

65 kg of water
14.6 kg of a 28% strength aqueous emulsifier solution of a neutralized $C_{12}$–$C_{14}$ fatty alcohol ether sulfate with 3 mol of ethylene oxide
0.5 kg of sodium hydroxide solution (50%)
54.7 kg of methacrylamide (15% strength)
54.7 kg of N-methylolmethacrylamide (15% strength)

-continued 12.3 kg of methacrylic acid
65.6 kg of methyl methacrylate
373.1 kg of n-butyl acrylate The reaction mixture was subsequently heated to 80° C., and 10% of an initiator solution comprising 1.23 kg of sodium persulfate in 48 kg of water was added. After 5 minutes, the remainder of the monomer emulsion was added over 2 hours, and the remainder of the initiator solution over 2.5 hours, and then the polymerization batch was maintained at 80° C. in the reactor for a further hour. Subsequently a sample A was taken and its residual monomer content determined by gas chromatography (Sample 1A). The viscosity of the dispersion was about 30 mPas. The mixing time of the reactor was 1.2 minutes.

1b. Aftertreatment:

A feedstream IA consisting of 11.5 kg of a 9% strength aqueous solution of tert-butyl hydroperoxide, and a feedstream IB consisting of a mixture of 18.6 kg of water, 0.58 kg of sodium disulfite and 0.33 kg of acetone, were metered into the reaction mixture simultaneously over a metering time of 3 minutes on opposite sides through the reactor lid. In the course of these additions the batch was cooled to 30° C. in 90 minutes and a sample of the product was taken after 20, 40, 60 and 90 minutes for gas-chromatographic determination of the residual monomer content (samples 1B, 1C, 1D and 1E, respectively). After this 90-minute period the batch was neutralized with 25% strength aqueous ammonia and filtered through a 125 μm filter. A coagulum-free polymer dispersion was obtained with a solids content of 40.2%, an LT of 92% and a pH of 7.2. The particle weight distribution is monomodal, with narrow distribution. About 1 hour after the production of the aftertreated polymer dispersion, a further sample (Example 1F) was taken in order to determine the residual monomer content. The residual monomer contents found for samples 1A–1F are shown in Table 1.

EXAMPLE 2

2a. The exact procedure of Example 1a was repeated and a sample 2A taken.

2b. Aftertreatment:

The procedure of Example 1was repeated but with metered addition of a feedstream IIA, which corresponded to the feedstream IA, over a period of 5 minutes through the reactor lid to the reaction mixture, into which it was incorporated by stirring for 5 minutes. A feedstream IIB (reducing agent), whose composition corresponded to the feedstream IB, was metered continuously into the reaction mixture over a metering time of 90 minutes throughout the cooling time of 90 minutes. As indicated in Example 1b, samples were taken for determination of the residual monomer content (samples 2B, 2C, 2D, 2E, 2F). The results of these determinations are shown in Table 1.

EXAMPLE 3

3a. The procedure of Example 1a was repeated and a sample was taken for residual monomer determination (Sample 3A).

3b. Aftertreatment:

The procedure of Example 1b was repeated but with metered addition of a feedstream IIIA, which corresponded to the feedstream IA, over a period of 5 minutes through the reactor lid to the reaction mixture, into which it was incorporated by stirring for 5 minutes. A feedstream IIIB, which corresponded to the feedstream IB, was metered in through the reactor floor throughout the 1.5-hour cooling from 80 to 30° C. (metering time 90 minutes). As indicated in Example 1b, samples were taken for determination of the residual monomer content (samples 3B, 3C, 3D, 3E, 3F). The results are shown in Table 1.

EXAMPLE 4

4a. The procedure of Example 1a was repeated and a sample was taken for determination of the residual monomer content.

4b. Aftertreatment:

The procedure of Example 1b was repeated but was (sample 4A) an oxidizing agent feedstream IVA, which corresponded in its composition to the feedstream IA, and a reducing agent feedstream IVB, which corresponded in its composition to the additive IB, were metered continuously and simultaneously into the reaction mixture throughout the 1.5-hour cooling time from above through the reactor lid on opposite sides (metering time for both feedstreams 90 minutes each). As indicated in Example 1b, samples were taken for determination of the residual monomer content (samples 4B, 4C, 4D, 4E, 4F). The results are shown in Table 1.

EXAMPLE 5

5a. The procedure of Example 1a was repeated except that the monomer emulsion ME was metered in over 4 hours and the initiator solution over 4.5 hours and then the batch was held at the polymerization temperature for 30 minutes more. As indicated in Example 1a, a sample was taken in order to determine the residual monomer content following the main polymerization (sample 5A).

5b. Aftertreatment:

The procedure of Example 1b was repeated except that the feed streams of the redox initiator components VA and VB, which correspond to the feedstreams IA and IB, were metered in simultaneously but with spatial separation on opposite sides from above through the reactor lid over a metering time of 60 minutes into the reaction mixture which had been heated to 80° C. After metering times of 20, 40 and 60 minutes samples were taken from the reaction mixture in order to determine the residual monomer content (samples 5B, 5C, 5D). The results are shown in Table 1.

EXAMPLE 6

6a. The procedure of Example 1a was repeated, and a sample (sample 6A) was taken for residual monomer determination.

6b. Aftertreatment:

The procedure of Example 1b was repeated. Regarding the feedstreams of the redox initiator components, the feedstream VIA, which corresponds to the feedstream IA, was metered into the 80° C. reaction mixture from above through the reactor lid over 15 minutes. The reaction mixture was subsequently cooled to 30° C. Feedstream VIB, which corresponds in its composition to the reducing agent of feedstream IB, was metered in to the reaction mixture from above through the reactor lid over a metering time of 120 minutes. After 20, 40, 60, 90 and 120 minutes samples were taken for determination of the residual monomer content (samples 6B, 6C, 6D, 6E, 6F). The results are shown in Table 1.

TABLE 1

Method and time of addition of tert-butyl hydroperoxide solution (OX) and acetone bisulfite solution as reducing agent (Red) in the aftertreatment, and residual monomer contents of n-butyl acrylate (BA) and methyl methacrylate (MMA) of the product samples taken prior to, during and following aftertreatment

|  | Ex. 1 | Ex. 2 | Ex. 3 | Ex. 4 | Ex. 5 | Ex. 6 |
|---|---|---|---|---|---|---|
| Addition of OX: |  |  |  |  |  |  |
| location | top | top | top | top | top | top |
| time (Min.) | 3 | 5 | 5 | 90 | 60 | 15 |
| Addition of Red |  |  |  |  |  |  |
| location | top | top | bottom | top | top | top |
| time (Min.) | 3 | 90 | 90 | 90 | 60 | 120 |
| Addition |  |  |  |  |  |  |
| simultaneously | + | – | – | + | + | – |
| in succession | – | + | + | – | – | + |
| Samples A | (1A) | (2A) | (3A) | (4A) | (5A) | (6A) |
| initial value |  |  |  |  |  |  |
| BA (ppm) | 2800 | 2800 | 3000 | 2600 | 2800 | 3000 |
| MMA (ppm) | 20 | 10 | 20 | 10 | 20 | 10 |
| Samples B | (1B) | (2B) | (3B) | (4B) | (5B) | (6B) |
| after 20 min. |  |  |  |  |  |  |
| BA (ppm) | 1500 | 1600 | 850 | 2100 | 1500 | 1300 |
| MMA (ppm) | 15 | <10 | <10 | 15 | <10 | <10 |
| Samples C | (1C) | (2C) | (3C) | (4C) | (5C) | (6C) |
| after 40 min. |  |  |  |  |  |  |
| BA (ppm) | 1300 | 1000 | 580 | 2100 | 540 | 580 |
| MMA (ppm) | 10 | <10 | <10 | 10 | <10 | <10 |
| Samples D | (1D) | (2D) | (3D) | (4D) | (5D) | (6D) |
| after 60 min. |  |  |  |  |  |  |
| BA (ppm) | 1100 | 830 | 180 | 1300 | 170 | 320 |
| MMA (ppm) | 10 | <10 | <10 | 10 | <10 | <10 |
| Samples E | (1E) | (2E) | (3E) | (4E) | (5E) | (6E) |
| after 90 min. |  |  |  |  |  |  |
| BA (ppm) | 1100 | 480 | 100 | 370 | – | 150 |
| MMA (ppm) | <10 | <10 | <10 | <10 | – | <10 |
| Samples F | (1F) | (2F) | (3F) | (4F) | (5F) | (6F) |
| after 120 min. |  |  |  |  |  |  |
| BA (ppm) | 1050 | 480 | 100 | 300 | – | 140 |
| MMA (ppm) | <10 | <10 | <10 | <10 | – | <10 |

Examples 7 to 12 and Comparative Experiment CE

Aftertreatment of highly concentrated polymer dispersions with different redox systems and methods of addition:

7–12a. Preparing highly concentrated polymer dispersions

A monomer emulsion 7–12C was prepared, having the following composition:

| | |
|---|---|
| 90 kg | of water |
| 18 kg | of the sodium salt of dodecylbenzenesulfonic acid as a 15% strength aqueous solution |
| 0.082 kg | of iron(II) sulfate heptahydrate |
| 0.70 kg | of tert.dodecyl mercaptan |
| 38 kg | of N-methylolmethacrylamide (15% strength) |
| 29 kg | of acrylonitrile |
| 6 kg | of acrylic acid |
| 539 kg | of n-butyl acrylate |

A kettle, equipped with an anchor stirrer, having a volume of 1.6 m$^3$, which is $\frac{2}{3}$ full and has a ratio of liquid level to reactor diameter, H:D, of 0.88, was charged with 105 kg of water; this initial charge was heated with stirring at 40 rpm, and 0.5% of the monomer emulsion 7–12C was added. After one minute of stirring, 20% of a solution of 2.9 kg of sodium persulfate in 110 kg of water was added. 10 minutes later the addition - continuously over 4 hours - of the remainder of the monomer emulsion 7–12C and the remainder of the initiator solution was commenced. When the additions were complete a sample (sample A) was taken.

7–12b. Aftertreating the polymer dispersions of Examples 7–12 and Comparative Experiment (CE)

The polymer dispersions prepared were each admixed with 11.5 kg of a 10% strength solution of tert-butyl hydroperoxide. Then in each case a solution of the following reducing agents was metered in over 2 hours:

Comparative Experiment CE: Water with no reducing agent

Example 7: 18% strength aqueous solution of ascorbic acid

Example 8: 18% strength aqueous solution of ascorbic acid

Example 9: 18% strength aqueous solution of Rongalit® C.

Example 10: Mixture of 10% strength sodium disulfite solution with acetone (weight ratio 15:1) (ABS)

Example 11: 16% strength aqueous mercaptoethanol solution ( HO—CH$_2$—CH$_2$—SH ) (ME)

Example 12: 1.2% strength formamidinesulfinic acid solution (FAS)

During the addition a sample was taken in each case after 30, 60 and 120 minutes, in which the content of the residual monomers - n-butyl acrylate (BA) and acrylonitrile (AN) - was determined by gas chromatography. After cooling, the aftertreated polymer dispersions were adjusted to a pH of about 7.5 using a 25% strength aqueous ammonia solution. The examples and their results are summarized in Tables 2 and 3.

TABLE 2

|  | CE Ex. 7 | Ex. 8 | Ex. 9 | Ex. 10 | Ex. 11 | Ex. 12 |
|---|---|---|---|---|---|---|
| Reducing agent: | | | | | | |
| none | + | – | – | – | – | – |
| ascorbic acid | – | + | + | – | – | – |
| Rongalit C | – | – | – | + | – | – |
| ABS | – | – | – | – | + | – |
| ME | – | – | – | – | – | + |
| FAS | – | – | – | – | – | – |
| Addition of Red | | | | | | + |
| location | top | bottom | top | bottom | top | bottom | top |
| time (h) | 2 | 2 | 2 | 2 | 2 | 3 | 2 |
| parts per 100 parts of monomer | — | 0.20 | 0.20 | 0.2 | 0.26 | 0.3 | 0.25 |
| Solids content (%) | 59.7 | 60.2 | 59.1 | 59.9 | 59.6 | 59.1 | 51.9 |
| pH | 7.3 | 7.2 | 7.7 | 7.5 | 7.7 | 7.3 | 7.8 |
| LT | 25% | 26% | 28% | 26% | 29% | 23% | 23% |
| Visc. (mPas) | — | 105 | 42 | 42 | 72 | 84 | 15 |
| Coagulum (kg) | 0.01 | 0.01 | 0.25 | 0.50 | 0.02 | 0.05 | 0.50 |

TABLE 3

Contents of residual monomers n-butyl acrylate (BA) and acrylonitrile (AN) in ppm in the product samples taken prior to, during and following the aftertreatment

|  | VV | Ex. 7 | Ex. 8 | Ex. 9 | Ex. 10 | Ex. 11 | Ex. 12 |
|---|---|---|---|---|---|---|---|
| Samples A start | | | | | | | |
| BA (ppm) | 42000 | 55000 | 43000 | 43000 | 35000 | 44000 | 49000 |
| AN (ppm) | 2050 | 2400 | 2000 | 21000 | 1800 | 1800 | 2800 |
| Samples B (30 min.) | | | | | | | |
| BA (ppm) | 40000 | 15000 | 13000 | 13000 | 7200 | 18000 | 15000 |
| AN (ppm) | 2000 | 690 | 600 | 470 | 270 | 810 | 880 |
| Samples C (60 min.) | | | | | | | |
| BA (ppm) | 39000 | 10000 | 5700 | 7800 | 2400 | 6400 | 5600 |
| AN (ppm) | 1950 | 430 | 230 | 340 | 20 | 220 | 230 |
| Samples D (120 min.) | | | | | | | |
| BA (ppm) | 39000 | 610 | 660 | 1300 | 230 | 1000 | 580 |
| AN (ppm) | 1900 | 10 | 10 | 30 | <10 | <10 | <10 |
| Samples E end values | | | | | | | |
| BA (ppm) | 38000 | 600 | 610 | 1200 | 230 | 850 | 290 |
| AN (ppm) | 1800 | <10 | <10 | 20 | <10 | <10 | <10 |

We claim:

1. A process for reducing the residual monomer content in a liquid solution, mixture, melt, suspension or dispersion of a polymer prepared by free-radical polymerization in a liquid system by postpolymerization with addition of a redox initiator system at a reaction temperature from 20 to 140° C., which comprises gradually metering at least one of the redox initiator components required to initiate polymerization of the residual monomers into said liquid system in a production reactor having a volume of more than 20 liters with from 1 to 30 minutes mixing time of said liquid system as determined by the schlieren method in said production reactor, over a metering time which is from about 10 to 250 times said mixing time of said liquid system in said production reactor.

2. The process as claimed in claim 1, wherein measures to reduce said mixing time of said liquid system in said production reactor are taken before or during the metered addition of said at least one of said redox initiator components.

3. The process as claimed in claim 1, wherein the addition of oxidation and reduction components of said redox initiator system to said liquid system takes place at spatially separate locations and simultaneously or in succession.

4. The process as claimed in claim 3, wherein one of said components of said redox initiator system is added to said production reactor from above and the other through the floor of said reactor.

5. The process as claimed in claim 1, wherein said mixing time of said liquid system in said production reactor is reduced by using a multistage close-clearance stirrer with a strong axial mixing effect in the reactor.

6. The process as claimed in claim 1, wherein said mixing time of said liquid system is reduced by said production reactor having one or more stirrers, impellers, propellers, guide vanes, flow disrupters or flow diverters.

7. The process as claimed in claim 1, wherein said metering time is from 20 to 100 times said mixing time of said liquid system in said production reactor.

8. The process as claimed in claim 1, wherein the residual monomers are esters of acrylic acid, esters of methacrylic acid, acrylonitrile and/or methacrylonitrile.

9. The process as claimed in claim 1, wherein said production reactor has a volume of more than 100 liters.

10. The process as claimed in claim 1, wherein said metering is in portions or continuous.

11. The process as claimed in claim 1, wherein said period of metering time is from about 25 to 50 times said mixing time of said liquid system in said production reactor.

12. The process as claimed in claim 1, (wherein the residual monomers are acrylates, methacrylates, styrene, vinyl chloride, vinyl acetate, butadiene, ethylene, acrylic acid, methacrylic acid, methacrylamide, N-methylol derivatives of methacrylamide, acrylamide, N-methylol derivatives of acrylamide, maleic acid, maleic anhydride, acrylonitrile, methacrylonitrile, hydroxyalkylacrylates or hydroxyalkyl methacrylates.

\* \* \* \* \*